March 4, 1958  D. MacD. PATERSON  2,825,165
DEVICES FOR HOLDING FILM TRANSPARENCIES
Filed June 10, 1957

Inventor
Donald MacDougal Paterson
by Stevens, Davis, Miller & Mosher
his attorneys

United States Patent Office 2,825,165
Patented Mar. 4, 1958

2,825,165

DEVICES FOR HOLDING FILM TRANSPARENCIES

Donald MacDougal Paterson, London, England

Application June 10, 1957, Serial No. 664,616

Claims priority, application Great Britain November 23, 1956

4 Claims. (Cl. 40—152)

This invention relates to devices for holding film transparencies and more particularly to such devices for use in viewing multi-colour or monochrome photographic transparencies, where the image is to be projected on to a screen.

A large number of varieties of such devices have been described and used, and in the main have suffered from disadvantages. They all consist essentially of an apertured frame provided with two sheets of glass between which the transparency is located. The frame must of course be openable for the insertion of the transparency and must when closed hold the transparency firmly in position.

It is the object of the present invention to provide an improved form of such device for the purposes just indicated, which apart from satisfying the mechanical requirements indicated above is both simple to make and aesthetic in appearance.

According to the present invention a device for holding a film transparency comprises a rectangular frame element, an envelope adapted to fit into said frame and itself having corresponding apertures in its two faces, two sheets of light-transmitting material of which one is transparent within said envelope, and one or more inwardly directed projections on one edge of said frame adapted, when the envelope is fitted into the frame, to enter the open end of the envelope.

The invention will be further described with reference to the accompanying drawings which illustrate one particular embodiment of the invention and in which.

Figures 1, 2:
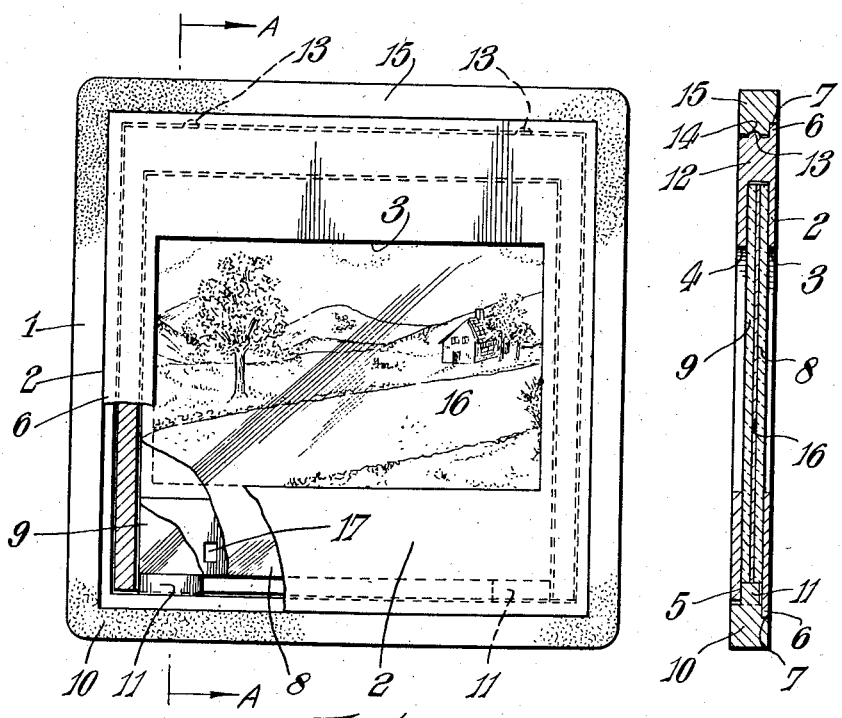
Fig. 1 illustrates the device in elevation and partial section.
Fig. 2 is a section on the line A—A of Fig. 1.

Referring to these drawings, the device consists of an open frame 1 within which is an envelope 2 having apertures 3, 4 in its opposite faces. As illustrated the opening to the envelope is at 5, the other three ends of the envelope being closed. The margins of the envelope 2 have a narrow flange 6 which, when the device is assembled, rests in the rebate 7 of the frame 1.

Within the enevelope 2 are located sheets of glass 8 and 9.

Along the edge 10 of the frame 1 are located projections 11. Along the edge 12 of the envelope 2 are located small "pips" 23 and there are provided depressions 14 in the edge 15 of the frame 1 mating therewith.

The device as illustrated is designed to carry a single image frame of a standard 35 mm. photographic film and the method of assembly is as follows. The frame, envelope and glasses are separated; the transparency is placed between the glasses and the assembly is inserted in the envelope via the open end 5. The envelope and contents is then located over the projections 11, which enter the open end 5 of the envelope and are so dimensioned that they abut the glasses and hold them in position. The upper end of the envelope (as illustrated) is then pressed into the frame so that the pips 13 pass the edge 15 of the frame and locate in the depressions 14.

The device is illustrated in the fully assembled condition, showing a transparency 16. A perforation, commonly present on such a transparency, is shown at 17.

To remove the transparency it is merely necessary to press the envelope out of the frame (i. e. bringing the pips 13 out of the depressions 14) and the whole assembly will then separate into its component parts.

The main elements of the structure, being the frame and envelope, are readily mouldable from synthetic plastic material by methods known per se. Advantageously the frame may be black and the envelope white or coloured, so that the frame affords the appearance of a "picture frame." It is an advantage from the standpoint of appearance that the frame is of integral structure, i. e. a complete frame showing no breaks or constructional details.

Advantageously an index mark is provided on the face of the envelope and on the frame to show, when the frame is assembled, where the pressure should be applied to disassemble it.

It is usually preferable to provide glasses of such thickness that when the film transparency is assembled between them they are not pressed by the envelope onto the transparency, so causing Newton's rings to appear. If desired a mask, e. g. of paper, may be provided between the glasses to avoid such a phenomenon occurring.

I claim:

1. A device for holding a film transparency which comprises a rectangular frame element, an envelope adapted to fit into said frame and itself having corresponding apertures in its two faces, two sheets of light-transmitting material of which at least one is transparent within said envelope, and at least one inwardly directed projection on one edge of said frame adapted, when the envelope is fitted into the frame, to enter the open end of the envelope.

2. A device for holding a film transparency which comprises a rectangular frame element, an envelope adapted to fit into said frame and itself having corresponding apertures in its two faces, two sheets of light-transmitting material of which at least one is transparent within said envelope, and at least one inwardly directed projection on one edge of said frame adapted, when the envelope is fitted into the frame, to enter the open end of the envelope and of dimensions sufficient to hold the said sheets and any film transparency between said sheets substantially against movement within the envelope.

3. A device for holding a film transparency which comprises a rectangular frame element, an envelope adapted to press-fit into said frame and itself having corresponding apertures in its two faces, two sheets of light-transmitting material of which at least one is transparent within said envelope, and at least one inwardly directed projection on one edge of said frame adapted, when the envelope is fitted into the frame, to enter the open end of the envelope, one or more mating-pips and depressions being provided respectively in the outer edge of the envelope and the inner edge of the frame, which engage when the envelope is press-fitted into the frame.

4. A device for holding a film transparency which comprises a rectangular frame element, an envelope adapted to press-fit into said frame and itself having corresponding apertures in its two faces, two sheets of light-transmitting material of which at least one is transparent within said envelope, and at least one inwardly directed projection on one edge of said frame adapted, when the envelope is fitted into the frame, to enter the open end of the envelope and of dimensions sufficient to hold the said sheets and any film transparency between said sheets substantially against movement within the envelope, one or more mating-pips and depressions being provided respectively in the outer edge of the envelope and the inner edge of the frame, which engage when the envelope is press-fitted into the frame.

References Cited in the file of this patent

UNITED STATES PATENTS

| | | |
|---|---|---|
| 1,291,375 | Berg | Jan. 14, 1919 |
| 2,535,265 | Caffrey | Dec. 26, 1950 |
| 2,697,889 | Heim | Dec. 28, 1954 |